(12) United States Patent
Goldner et al.

(10) Patent No.: US 8,842,162 B2
(45) Date of Patent: Sep. 23, 2014

(54) METHOD AND SYSTEM FOR IMPROVING SURVEILLANCE OF PTZ CAMERAS

(75) Inventors: Vladimir Goldner, Tel Aviv (IL); Guy Boudoukh, Ramat Hasharon (IL)

(73) Assignee: Nice-Systems Ltd, Ra'anana (IL)

( * ) Notice: Subject to any disclaimer, the term of this patent is extended or adjusted under 35 U.S.C. 154(b) by 176 days.

(21) Appl. No.: 13/586,884

(22) Filed: Aug. 16, 2012

(65) Prior Publication Data

US 2014/0049600 A1 Feb. 20, 2014

(51) Int. Cl.
*H04N 7/00* (2011.01)
*G06K 9/00* (2006.01)
*G08B 13/196* (2006.01)
*H04N 5/232* (2006.01)
*H04N 7/18* (2006.01)
*G08B 29/18* (2006.01)

(52) U.S. Cl.
CPC .. *H04N 7/18* (2013.01); *G06K 9/00* (2013.01); *G08B 13/19608* (2013.01); *H04N 5/23238* (2013.01); *G08B 13/19604* (2013.01); *G08B 29/185* (2013.01)
USPC .......................................................... 348/36

(58) Field of Classification Search
USPC .......................................................... 348/36
See application file for complete search history.

(56) References Cited

PUBLICATIONS

Authors: Chu-Sing Yang et al. Title: PTZ camera based position tracking in IP-surveillance system; Date of Conference: Nov. 30, 2008-Dec. 3, 2008 Published in: 3rd International Conference on Sensing Technology, Nov.30-Dec. 3, 2008, Tainan, Taiwan Pertinent pp. 142-146; Print ISBN:978-1-4244-2176-3.*

* cited by examiner

*Primary Examiner* — Chirag R Patel
*Assistant Examiner* — Marshall McLeod
(74) *Attorney, Agent, or Firm* — Soroker-Agmon

(57) ABSTRACT

The subject matter discloses a method, comprising obtaining a scene from a video camera and defining at least one point of the scene; creating a first scene terrain model of the scene, said first scene terrain model comprises a typical human object size in pixels in said at least one point of the scene; creating a second scene model of the scene, said second model defines a false positive determination that said at least one point comprises a human object; wherein said second scene model is created when the scene does not contain a human object; obtaining an image of the scene, said image is captured by a video camera; determining whether the human object is detected at the at least one point of said captured image by applying said first scene terrain model and said second scene model on the least one point.

16 Claims, 10 Drawing Sheets

METHOD AND SYSTEM FOR IMPROVING SURVEILLANCE OF PTZ CAMERAS

FIELD OF THE INVENTION

The subject matter relates generally to PTZ cameras, and more specifically to surveillance using PTZ cameras.

BACKGROUND OF THE INVENTION

A main product in Video Analytics is PIDS (Perimeter Intrusion Detection System). Normally it includes one fixed video camera, which detects all suspected objects in its field of view (FOV), raises an alarm and tracks the suspected objects until they remain in the FOV.

However, there is a problem in trade-off between the FOV size and the zoom: either the camera sees only narrow region, or the objects are small and not recognizable. PTZ (pan/tilt/zoom) camera comes to solve this trade-off. PTZ camera has 3 degrees of freedom: it may move in two directions (vertical and horizontal) and to zoom-in/out.

There are two types of autonomous PTZ tracking solutions. In the first, the intrusion detection is performed in the PTZ camera (either static or scanning), that continues with tracking after detection. In the second, the intrusion detection is performed in a fixed camera, which triggers the PTZ camera.

The most sensitive part of the PTZ tracking is the object's initial "acquiring" or start of the tracking. Therefore, the existing solutions are less robust especially at this stage. Any moving object that appears in the frame may "catch" the PTZ camera. Even if there are no moving pixels in the frame other than the object, the object's "acquisition" fails frequently because of lack of the clean background model (without the object), especially if it moves toward the camera or goes far from the camera.

All existing human detection algorithms are not exact enough and not fast enough. On one hand, usage of the background model or motion detection as a filter for human detection may reduce the number of false detections to speed up the recognition. On the other hand, we don't have a clean background model. There is an assumption that the human has to move in order to be detected. A moving nuisance in the scene (trees, shadows, etc.), makes the background/motion even less useful. There is a technical need for additional tools for filtering non-relevant candidates of human detection algorithm.

SUMMARY

It is an object of the subject matter to disclose a method, comprising: obtaining a scene from a video camera and defining at least one point of the scene; creating a first scene terrain model of the scene, said first scene terrain model comprises a typical human object size in pixels in said at least one point of the scene;

creating a second scene model of the scene, said second model defines a false positive determination that said at least one point comprises a human object; wherein said second scene model is created when the scene does not contain a human object; obtaining an image of the scene, said image is captured by a video camera; determining whether the human object is detected at the at least one point of said captured image by applying said first scene terrain model and said second scene model on the least one point.

In some cases, the method further comprises obtaining a position of a PTZ camera, the position including values of pan, tilt and zoom; detecting a PTZ frame by the PTZ camera at the obtained PTZ position; obtaining a successful detection of the human object in a specific location in the frame of the PTZ camera; determining the polar coordinates of the human object; determining an altitude of the human object.

In some cases, the method further comprises obtaining a panoramic map of the detected PTZ frame and identifying a point of the panoramic map closest to the detected human object, according to the determined polar coordinates. In some cases, the method further comprises determining a matching point in the panoramic map closest to the specific pixel.

In some cases, determining the altitude of the object after obtaining a bounding box of human object, and selecting two pixels of the bounding box. In some cases, the two pixels are a top pixel having top coordinates (x, y1) and a bottom pixel having bottom coordinates (x, y2), defining x as the horizontal middle of the bounding box. In some cases, the method further comprises converting the top pixel and the bottom pixel into polar coordinates, thereby obtaining a polar top pixel ($\Pi 1$, $\theta 1$) and a polar bottom pixel ($\Pi 2$, $\theta 2$).

In some cases, the method further comprises converting the polar coordinates of top pixel and the bottom pixel into 3D world coordinates. In some cases, the method further comprises obtaining 2 rays starting from a 3D origin located at a first ray pixel $P1=z1v1$, and a second ray pixel $P2=z2v2$. In some cases, determining the altitude of a standing human, wherein a line connecting the first ray pixel and the second ray pixel is defined as vertical and parallel to Y-axis.

In some cases, the method further comprises determining the object's altitude in a specific point after determining a Y-coordinate of the second ray pixel. In some cases, creating the second scene model comprises determining HOG matching scores for all pixels of the image of the scene. In some cases, the method further comprises obtaining an object's location on the frame in pixels. In some cases, the method further comprises converting the human object's location in pixels into polar coordinates on a panoramic map.

In some cases, the method further comprises obtaining Panoramic HOG point associated to the polar coordinates of the pixels in which the human object is located.

In some cases, the second scene model of the scene comprises a Panoramic HOG map.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

DETAILED DESCRIPTION

Figure 1:
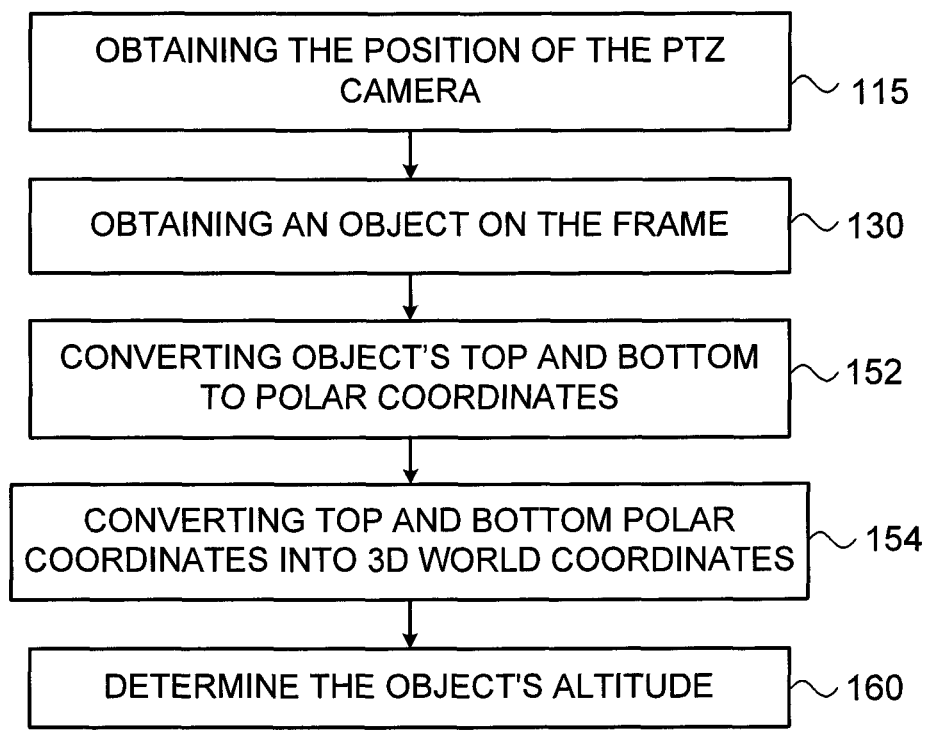
FIG. 1 shows a method for terrain map setup, according to some exemplary embodiments of the subject matter.

The disclosed subject matter provides for a method for human detection. The method comprises detecting a human object by a camera, for example a fixed camera. Then, the fixed camera transmits data related to the human object to a PTZ camera. Such data may be 2D frame position, size and speed. Then, the PTZ camera translates the data related to the human object to 3D world coordinates. The PTZ camera then determines an optimal pose $T_1$ in terms of pan/tilt/zoom. The optimal pose is defined as a pose in which the object's predicted location is in the frame center, with moderate predefined zoom. The learned terrain panoramic map helps to calculate more accurately the optimal pose of the PTZ camera. Since the exact object's location in the frame captured by the PTZ camera is unknown and the camera's jump to the optimal pose $T_1$ may take a few seconds, then the predicted object's location is not exact. Practically the object may be located at any part of the PTZ frame. Therefore, human detection mechanism is necessary.

Motivation

The intrusion detection is performed in a fixed (static) camera, where many advanced tools minimizing the false alarm rate may work only on fixed camera. However, the alarm only is not enough: the zoomed visualization of the suspected intruder is required. PTZ camera may jump to the appropriate zoomed pose, to detect the intruder in the PTZ frame and to track it as long as possible, such that it appears with sufficient zoom. One technical problem addressed by the subject matter is to detect a human object in the frame captured by the PTZ camera. The technical solution provides for detection that uses a human detection algorithm calculating a match between HOG features on the frame against a predefined HOG human model.

Challenges

There are two challenges in the technical solution disclosed above: (a) the human size in pixels in various parts of the scene is unknown, (b) the scene detected by the camera usually contains several places that have a high matching score when compared with a predefined human HOG model. The unknown size of the human object in various parts of the scene causes both a high CPU consumption and much higher false detection probability.

The technical solution of the disclosed subject matter provides for reducing the probability of false detections and improving the detection speed, given a candidate at some location in the frame captured by the PTZ camera. The technical solution determines and uses two parameters:

a. Typical human size (in pixels) at the given location b. A-priori probability of false detection at the given location.

These two parameters may be determined easily in a static camera, but they are much more challenging when performed by the PTZ camera.

The method for detecting a human object according to the disclosed subject matter utilizes two panoramic maps, one panoramic map for each parameter:

a. The first panoramic map is a Panoramic altitudes map that describes the scene 3D terrain with altitudes. The Panoramic altitudes map enables to determine a typical human size in pixels at any location on the frame for any PTZ position.

b. The second panoramic map is a Panoramic HOG (PHOG) map that describes the similarity of different areas in the scene to the predefined human HOG model, at any location on the frame for any PTZ position.

The two panoramic maps may be updated automatically after every detection session.

The method includes determining the scene geometry and terrain. The method obtains the panoramic altitudes map in which every point of the panoramic altitudes map contains the altitude of the appropriate 3D world point on the scene. Then, the method comprises generating a 3D mesh representing the scene's terrain according to the panoramic map points with altitudes.

The scene terrain is refined when the panoramic altitudes map is updated after every successful human detection session.

The method also comprises determining frame perspective of the PTZ camera after the jump. The frame perspective represents determining the size of the human object in pixels at any place on the frame. Such determination is made according to the calculated scene geometry, as disclosed below.

The method also comprises obtaining a map of Histogram of Gradients (HOG) features that are stored in the map after every detection session. The human detection on the PTZ camera is performed based on the Histogram of Gradients (HOG) features. A HOG score calculated in some regions of the frame indicates the similarity of the region with a human object, using a predefined human HOG model. In order to decrease the number of false detections, the method of the disclosed subject matter uses the Panoramic HOG (PHOG) map that represents "False Humans" panoramic map that was learned based on the HOG feedback from previous detection sessions. The PHOG map learns the scene, stores all the locations or areas on the scene that are similar to the human object based on a high HOG score. Such areas having a high HOG score are more likely to mistakenly detect a scene as having a human objects. In addition, in order to decrease the number of false detections and the CPU time, the method provides significant decrease in a searching range for the human detection by using the calculated typical human size, based on the determined scene geometry disclosed above.

Focal Length

The term focal length refers here to a distance between the PTZ camera's optical center and the frame plane (or CCD). Focal length knowledge is equivalent to the knowledge of the field of view angle. Given the frame size in pixels, the value of the focal length f may be represented in pixels. The focal length of the PTZ camera in zoom-out is known and used to determine the focal length for any given PTZ pose with known zoom.

Converting a 2D Frame Coordinates to 2D Polar Coordinates

Figure 8A:
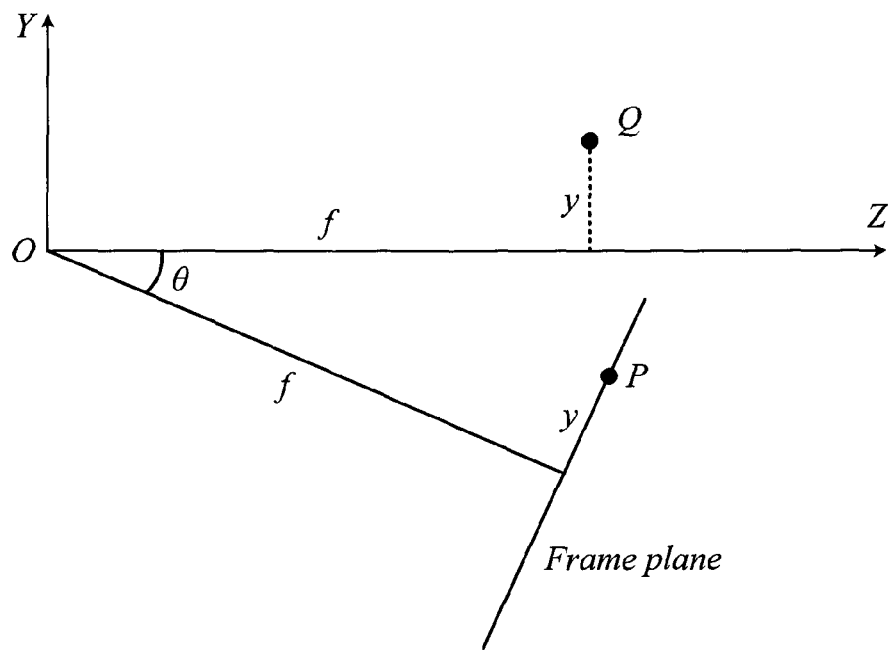
FIGS. 8A-8B illustrate a method of converting pixel in a frame to polar coordinates; and, FIG. 9 shows a system, using fixed and PTZ cameras, for implementing the method for detecting a human object in an image, according to exemplary embodiments of the disclosed subject matter.
Figure 8B:
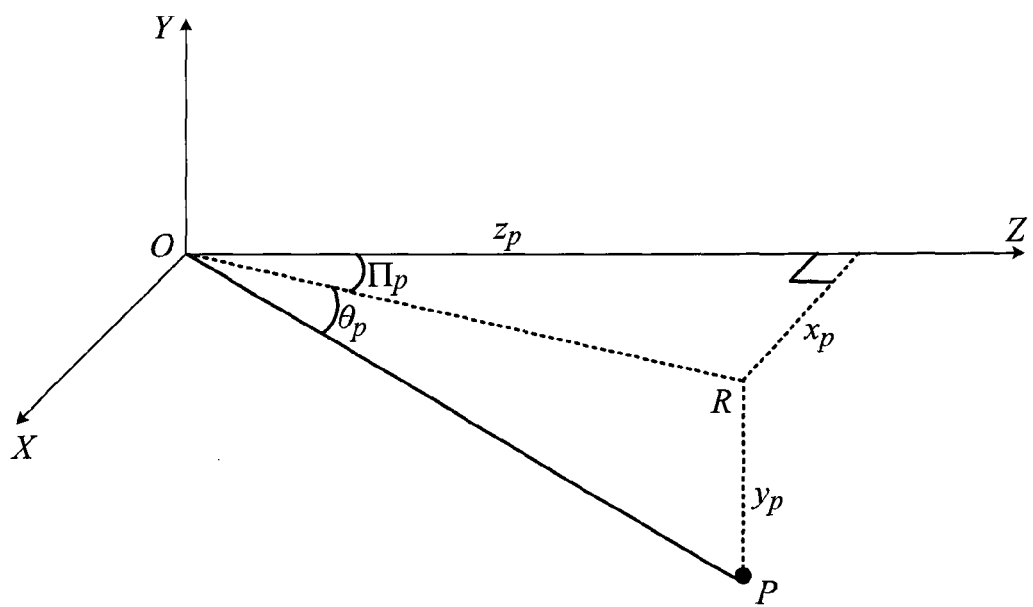

FIGS. 8A and 8B illustrate a method of converting a pixel in a frame to polar coordinates based on the current pan, tilt and zoom of the PTZ camera. The panoramic polar coordinates are similar to two-dimensional geographic earth coordinates by latitude and longitude. All points lying on a ray starting from an origin, such as the camera's optical center, have the same polar coordinates. Therefore, the panoramic polar coordinates of a pixel p are identical to panoramic polar coordinates of any point projected on the frame plane at pixel p. For example, the point (0,0,1) has polar coordinates (Π, 0), where the longitude Π is the camera's pan.

Given the pan, tilt and zoom, a 3D coordinates system is defined that depends only on the pan and determining 3D parameters of the plane containing the camera frame, as shown in FIG. 8A. Given the PTZ camera's pan, the 3D coordinates system is defined such that:

The origin is defined as the camera's optical center,

Y axis is defined as a vertical line (PTZ panning axis), X and Z axes are horizontal;

X axis is parallel to the frame plane, i.e. the frame plane is perpendicular to the plane YZ.

The view direction of the viewer in FIG. 8A is parallel to the X axis, such that the X axis is invisible. FIG. 8A describes the calculation of the plane containing the camera frame in the 3D coordinates system. Given a pixel p=(x,y) on the frame, a 3D point Q=(x, y, f) is defined as a point lying on the plane Q, said plane Q is built perpendicular to the Z axis and containing the point (0,0,f).

The plane Q defines the frame plane of the PTZ camera, when the PTZ camera's tilt is zero. Let plane P be the rotation of the plane Q around the X axis by the angle θ, as the angle θ defines the PTZ camera's tilt. Let point $P=(x_p, y_p, z_p)$ be the rotation of the point Q around the X axis by the angle θ. The point P was generated such that it lies on the frame plane P and coincides with the 3D location of the pixel p=(x,y), also lying on the frame plane P.

Let R be the projection of P on the plane XZ as shown in FIG. 8B. Define $|OR|=\text{sqrt}(x_p^2+z_p^2)$. The vertical polar coordinate (latitude) of the pixel p is $θ_p=\text{arc tan}(y_p/|OR|)$. The horizontal polar coordinate (longitude) of the pixel p is $Π_p=Π+\text{arc tan}(x_p/z_p)$, where Π is the camera's pan angle. As a result, the pixel p is converted to polar coordinates and defined by a vertical polar coordinate and a horizontal polar coordinate $(Π_p, θ_p)$.

Converting Polar Coordinates to Rays in 3D World Coordinates

The inverted conversion is performed as follows:
Let P=(Π, θ) be a point in polar coordinates (FIG. 8B).
For simplicity, suppose $z_p=1$.
Let R be the projection of P on the plain XZ. R=(tan Π, 0, 1).
$|OR|=\text{sqrt}(1+\tan^2 Π)$.

$$P=z\cdot(\tan Π, |OR|\tan θ, 1)=z\cdot(\tan Π, \text{sqrt}(1+\tan^2 Π)\tan θ, 1),$$

where z is any positive real number. P is a world point on a ray connecting P with the origin O. Finally, P has a form z·v, where v is a known 3D vector.

Given an Object on the Frame, Calculating its Altitude on the 3D Scene

Figure 8C:
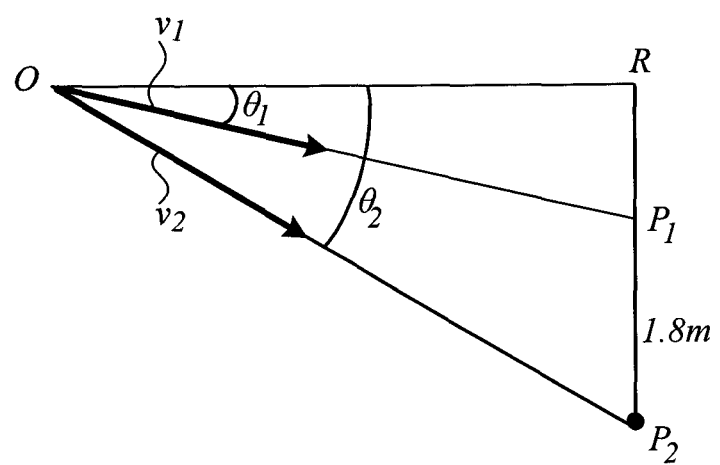

FIGS. 1 and 8C show a method for calculating a terrain's altitude for the given object on the frame captured by the PTZ camera.

Step 115 discloses obtaining the position of the PTZ camera. The PTZ camera comprises three PTZ parameters—pan, tilt and zoom. The above three PTZ parameters may be obtained by querying the PTZ camera and a receipt of a message from the PTZ camera.

Step 130 discloses obtaining a bounding box of the given object on the frame captured by the PTZ camera. Two pixels are picked to define the bounding box: a top pixel $t=(x, y_1)$ and a bottom pixel $b=(x, y_2)$, as x is the horizontal middle of the bounding box.

Step 152 discloses converting the top pixel t and the bottom pixel b to polar coordinates $(Π_1, θ_1)$ and $(Π_2, θ_2)$. The conversion process is described in details above.

Step 154 discloses converting the polar coordinates of the top pixel t and the bottom pixel b into rays in 3D world coordinates $zv_1$ and $zv_2$, respectively. The conversion process is described in details above. Let $P_1$ and $P_2$ be the 3D world coordinates of the object's top pixel and bottom pixel, lying on these rays, i.e. $P_1=z_1v_1$, $P_2=z_2v_2$.

After the inverted conversion, step 160 discloses determining the given object's altitude, according to the given object's size and location. The given object's altitude is equal to the altitude of the terrain at the object's location, i.e. the altitude of the object's bottom point3D in 3D world coordinates $P_2$, or the Y-coordinate of $P_2$.

Let R be the projection of $P_2$ on the plane XZ, i.e. the Y component is 0. The requested altitude is equal to $|RP_2|$, as shown in FIG. 8C.

In case of determining the altitude of a standing human object, the 3D object is vertical. Thus, a line connecting $P_1$ and $P_2$ is defined as vertical and parallel to Y-axis. The assumption is that a typical human height is 1.8 meters. Since $|RP_1|=|OR|\tan θ_1$ and $|RP_2|=|OR|\tan θ_2$, the following equation takes place:

$$|OR|\tan θ_2 - |OR|\tan θ_1 = 1.8,$$

$$|OR|=1.8/(\tan θ_2 - \tan θ_1).$$

As a result, the required altitude in meters is $|RP_2|=|OR|\tan θ_2=1.8 \tan θ_2/(\tan θ_2 - \tan θ_1)$, where $θ_1$ and $θ_2$ are the tilt component of the polar coordinates found in the step 152 of the top pixel t and the bottom pixel b of the given object in the bounding box.

Associating the Panoramic Altitudes Map, the Scene Geometry and Human Detection

At any stage, the terrain map contains points identified by their polar coordinates. The points identified by polar coordinates correspond to points on the 3D world scene. Since every point in the panoramic altitudes map is associated with a known altitude as disclosed above, a 3D mesh of the terrain may be built. The more points the panoramic altitudes map contains, the more points the 3D mesh contains, and more accurate description is obtained on the terrain. The accurate description of the terrain is required especially for objects located far from the camera, because small error in altitude estimation is translated to a large error in object size in pixels, which causes poor results in human detection. In addition, coarser estimation of typical human size results in trying more candidates during the human detection, which increases both error is probability and CPU consumption.

Updating the Panoramic Altitudes Map

After obtaining a new bounding box of a human object at the terrain, the method provides for updating the panoramic altitudes map.

Figure 2:
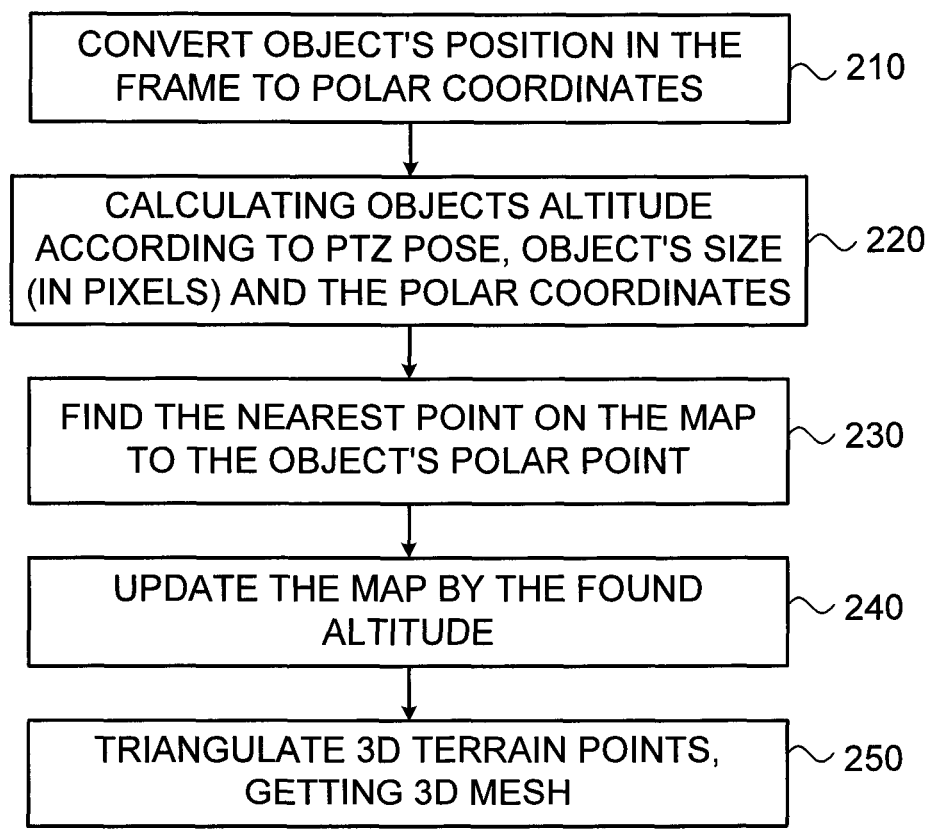
FIG. 2 shows a method for terrain map learning, according to exemplary embodiments of the disclosed subject matter.

FIG. 2 describes the updating process. Step 210 discloses finding the polar coordinates of the box's bottom p. Step 220 discloses calculating the altitude h at point p. Step 230 discloses finding the nearest point q on the map to p. Step 240 discloses the case in which the points p and q are too close, where the method comprises updating the altitude of q:

V(q):=(1−λ)V(q)+λh, where λ is the learning speed, for example equals 0.05. The term "too close" may define a case in which the distance between the points p and q is lower than a predefined threshold.

Step 250 discloses the case in which p and q are not too close, where the method comprises adding the point p to the panoramic altitudes map with V(p):=h. A new 3D terrain point was added, and the method performs triangulation on all terrain points, to achieve an updated 3D triangular mesh.

Initializing the Scene/Terrain Geometry—Setup Stage

A user draws one bounding box of human object on the frame for different PTZ camera positions. For each drawn bounding box, the panoramic altitudes map is updated as disclosed above.

In some cases, one box is satisfying for nearly planar scene. In some other cases, the scene model is initialized to a horizontal plane.

Some PTZ camera positions may have a long zoom that enables detecting the human objects when located far from the camera.

Updating the Terrain Geometry after Every Human Detection

After every successful human detection, the bounding box of the human is picked. Then, the panoramic altitudes map is updated as disclosed above.

Calculating Human Height in Pixels at any PTZ Position

Figure 3:
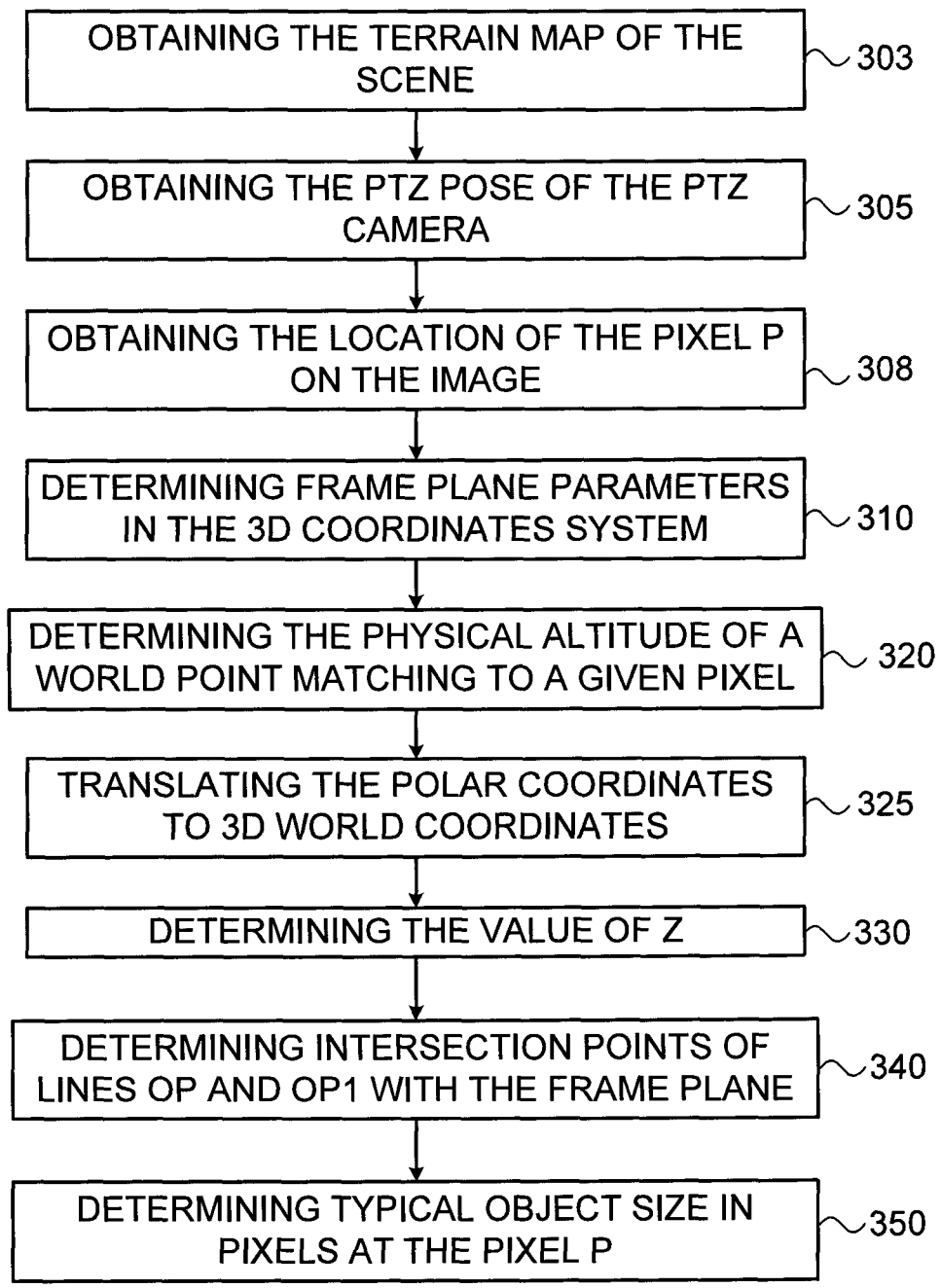
FIG. 3 shows a method for determining the height in pixels of a typical human, according to exemplary embodiments of the disclosed subject matter; and, FIG. 4 shows a method for learning a HoG map, according to exemplary embodiments of the disclosed subject matter.

FIG. 3 shows a method for determining the height in pixels of a typical human object at a given PTZ pose and at a given pixel, according to exemplary embodiments of the disclosed subject matter. In step 303, the method comprises obtaining the terrain map of the scene detected by the PTZ camera. In step 305, the method comprises obtaining the pose (pan, tilt, zoom) of the PTZ camera. In step 308, the method comprises obtaining the location of the pixel p on the PTZ frame.

In step 310, the method comprises determining frame plane parameters in the 3D coordinates system according to the PTZ camera pose obtained in step 305. The frame plane is defined as follows: the normal of the frame plane is perpendicular to X axis and has angle θ with Z axis, the distance of the frame plane from the origin is f (the focal length). In an exemplary manner, 1 pixel on the frame is equivalent to 1 meter in the scene.

Step 320 discloses determining the physical altitude of a world point matching to the given pixel p. Such determination may be performed by translating the location of the given pixel p to polar coordinates (Π, θ) and the vector v on the ray from the origin. Since the panoramic altitudes map is triangulated, the method obtains a triangle containing the polar point (Π, θ). By obtaining the altitudes of the vertices that assemble the triangle and performing interpolation between the vertices, is the method determines the altitude h at the given pixel p.

In step 325, the method comprises translating the polar coordinates (Π, θ) of the given pixel to 3D world coordinates, P=zv, as the constant z is unknown. In step 330, the method comprises determining the value of z, as the known altitude h equals to the Y-coordinate of P. This gives the 3D coordinates of P. Let $P_1$ be the human object's top The points P and $P_1$ have the same X and Z coordinates. The Y-coordinate of $P_1$ is 1.8 m above the point P. This gives the 3D coordinates of $P_1$.

Step 340 comprises determining intersection points of lines OP and $OP_1$ (O is the origin) with the frame plane determined in step 310, i.e. the pixels p and $p_1$ are the projections of P and $P_1$ on the frame plane. Since the frame plane was constructed such that its distance from the origin is f and the value is represented in pixels, the distance between p and $p_1$ is also represented in pixels.

Step 350 discloses determining typical object size in pixels as the distance between the pixels p and $p_1$.

Panoramic HOG (PHOG) Map Definition

The PHOG map contains points with polar coordinates: longitude & latitude. Any point in the PHOG map uniquely corresponds to a point on the 3D world scene. Similarly, any pixel on the frame captured by the PTZ camera at a given PTZ camera pose uniquely matches to one point on the map using polar coordinates. HOG (Histogram of Gradients) features calculated on the scene region of a typical human size are compared to a predefined HOG model of a human object.

Given a point p on the map, the HOG matching score is calculated on a frame rectangular segment, whose center is at the point p and having typical human size. The frame rectangular segment is a bounding box of the potential human object on the frame.

Typical human size is based on the scene geometry or altitudes map, which is initialized roughly and refined after each human detection. At the initial stages, the scene geometry is rough and typical human size is not exact. In such initial stages, the HOG matches may be performed on a wider range of bounding box sizes.

Learning of PHOG Map

Figure 4:
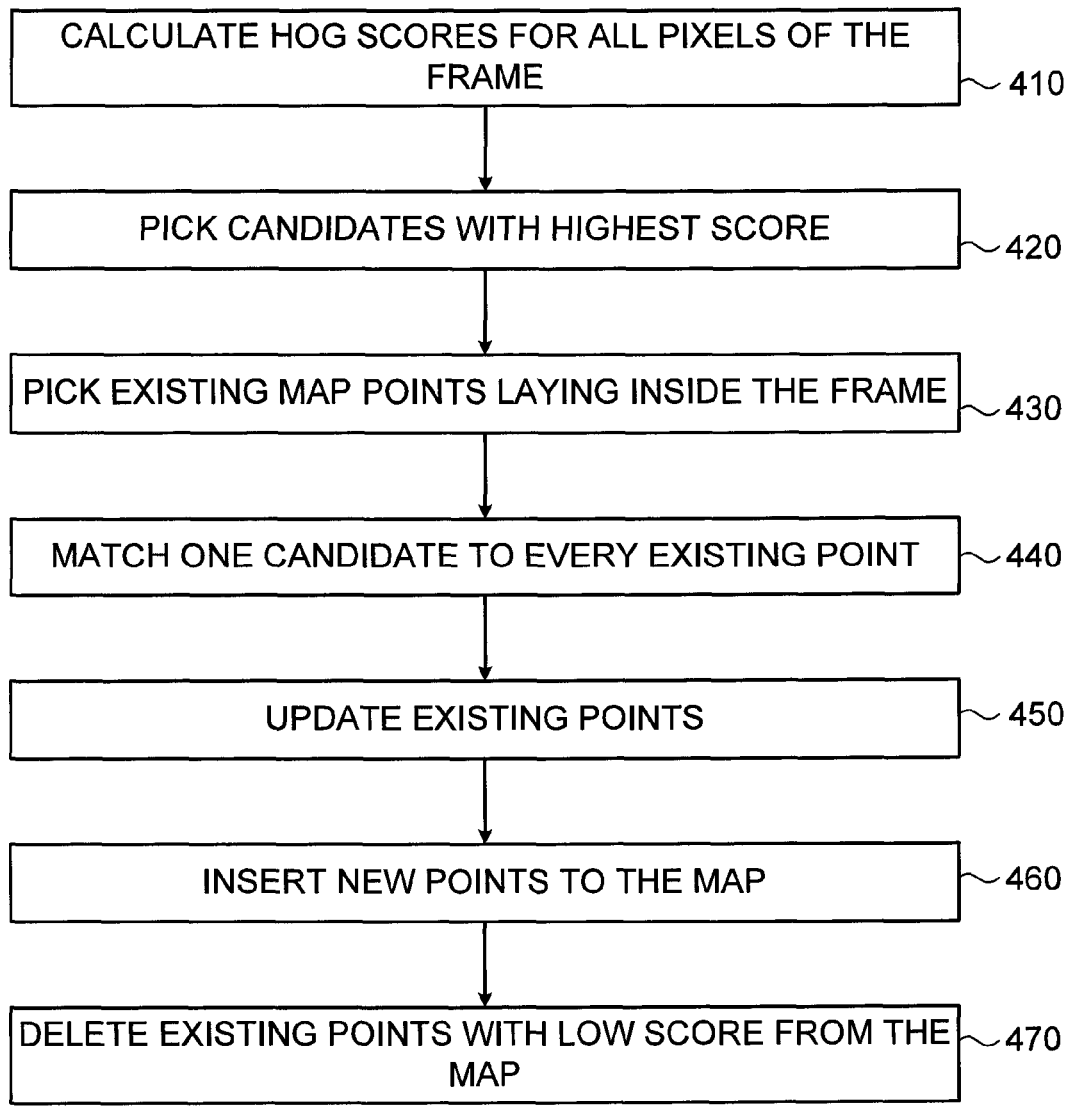

FIG. 4 shows a method for learning and reducing false-positive decisions when detecting a human object using a PHOG map, according to exemplary embodiments of the disclosed subject matter. A first threshold $T_1$ and a second threshold $T_2$ ($T_1 > T_2$) are stored in the system executing the method of the disclosed subject matter.

The following steps are performed after every jump of the PTZ camera to a new pose, as a result of an alarm, and a successful human detection.

Step 410 discloses determining HOG matching scores for all pixels of the frame, excluding pixels that belong to the detected human object. Let H(P) denote the HOG matching score at P, where P is either a pixel on the frame or an existing point in the PHOG map.

Step 420 discloses picking of all pixels, whose HOG score is a local maximum on their predefined neighborhood, and whose HOG score is greater than the threshold $T_1$. These pixels are candidates to be inserted to the PHOG map. After picking the candidates, the method discloses determining the polar coordinates of the chosen candidates. If there are candidates with too close coordinates, for example inside the same human bounding box, then the method chooses a candidate with a greater score.

The current PTZ frame defines a (nearly) rectangular area F in terms of polar coordinates. Step 430 discloses picking all existing points on the PHOG map that lay inside F, excluding the detected human object. Step 440 discloses finding all neighboring candidates that are located inside the human bounding box centered at P for each existing point P as picked in step 430. Then, the method discloses choosing the neighboring candidate C with the highest score H(C). H(C) represents the HOG matching score at point C on the frame. If C was not found, denote H(C)=0.

Step 450 discloses updating the H(P) on the map, the update may be according to the following formula: H(P):= $(1-\lambda)$H(P)+$\lambda$H(C), where $\lambda$=0.05 is learning speed. The location of P in polar coordinates is updated towards C in a similar way. Step 460 discloses inserting new points into the PHOG map: for any candidate C that did not have neighboring existing point, a new point is inserted to the PHOG map with initial value H(C). Step 470 discloses deleting any existing point P from the map with an H(P) score lower than a predefined threshold $T_2$.

Usage of the PHOG Map

Figure 5:
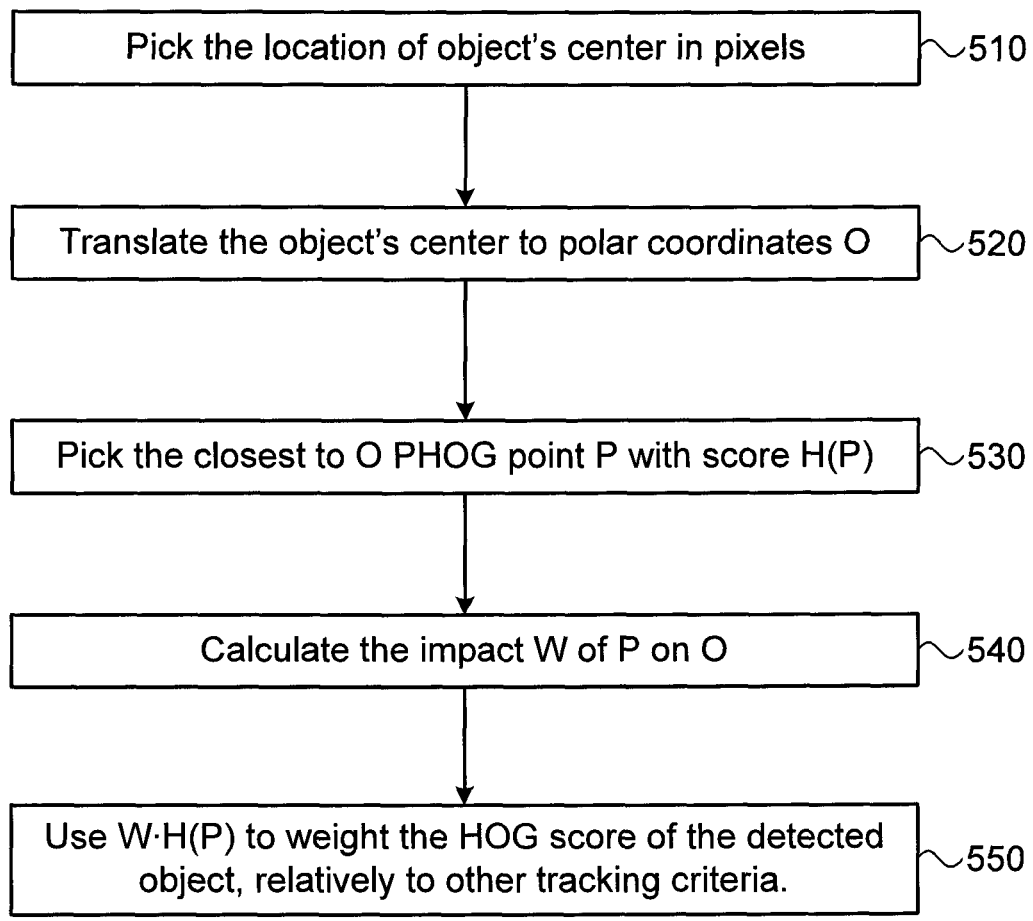
FIG. 5 shows a method for reducing false-positive decisions using the HoG map, according to exemplary embodiments of the disclosed subject matter.

FIG. 5 shows a method for detecting an object's similarity to a known model, according to exemplary embodiments of the disclosed subject matter. Step 510 discloses obtaining the object's location on the frame in pixels. Step 520 discloses converting the object's location in pixels into polar coordinates as disclosed above. Step 530 discloses obtaining the closest PHOG point P to the object's center O. H(P) is the PHOG value at P. Let d be the distance between P and O. Step 540 discloses obtaining a weight for the point P. The weight may be defined by the following formula, $W=e^{-\beta d/s}$, where e is exponent, $\beta$ is a constant and s is a typical human size at P.

W expresses the impact of P on the point O, based on the relative distance between P and O. Step 550 discloses updating the weight of the current HOG score on the final decision of human detector according to W. For example, when the value W·H(P) is high, it means the HOG score of the object at O is less reliable. Therefore, the human detector will give a lower weight to HOG matching score, relatively to other tracking criteria, like background subtraction score, object's trajectory, object's speed, etc.

Figure 6:
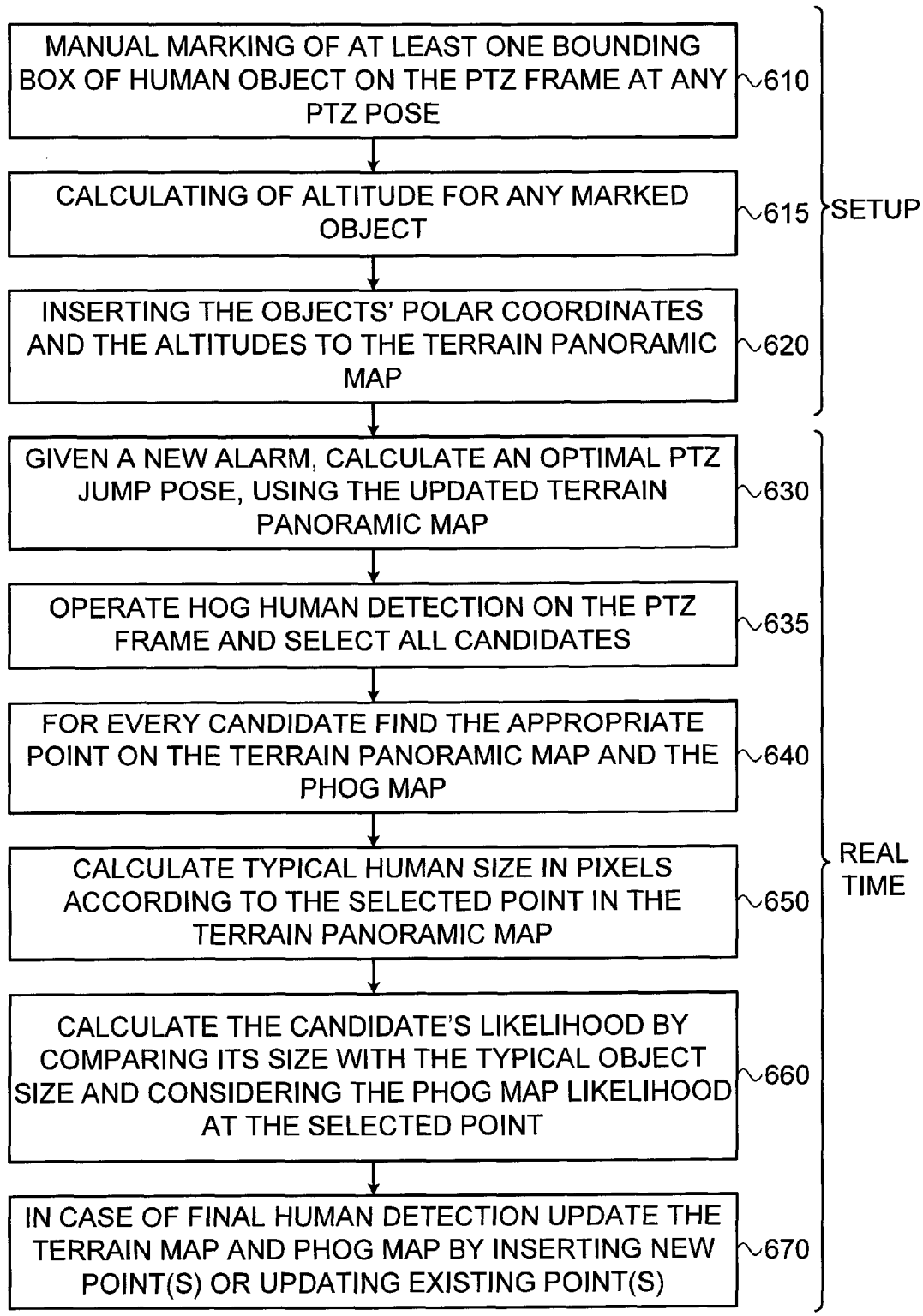
FIG. 6 shows a method detecting a human object in a PTZ image, according to exemplary embodiments of the disclosed subject matter.

FIG. 6 shows a method detecting a human object in an image, according to exemplary embodiments of the disclosed subject matter.

Setup Stage:

Step 610 discloses manually marking of at least one bounding box of human object on the PTZ frame at any PTZ pose. The bounding box surrounds a person residing on the scene viewed by the PTZ camera, and data related to the bounding box is stored and later used to determine the size in pixels of a typical object at different parts of the scene. Step 615 discloses calculating an altitude of a typical human object for any human object marked on step 610. Step 620 discloses inserting the objects' polar coordinates and altitudes to the panoramic terrain map, thus creating a first scene terrain model with typical human object size in pixels.

The method comprises creating a second scene model using a panoramic HOG map with false likelihood. The second scene model may include assigning a value for each of the segments of the scene, such that the value represents the similarity between the segment and a predefined human object model. The model may be based on a HoG map.

Real Time:

The method of the subject matter further discloses obtaining an image of the scene. The image of the scene may be captured by a standard video camera. A PTZ camera may capture the image.

Step 630 discloses calculating an optimal PTZ jump pose for the PTZ camera, given a new alarm. The calculation uses the updated terrain panoramic map. The alarm may be activated by detecting an intruder by a fixed camera. Step 635 discloses performing a HoG human detection on the frame captured by the PTZ camera and selecting all candidates. The candidates are points on the frame in which the intruder may be located.

Step 640 discloses determining an appropriate point on the terrain panoramic map and the panoramic HoG map for each candidate. The altitude of this point is obtained from the terrain map.

Step 650 discloses calculating typical human size in pixels according to the obtained altitude.

Step 660 discloses calculate the candidate's likelihood by comparing its size with a predefined typical object size and considering the Panoramic HoG map likelihood at the selected point.

Step 670 discloses a case in which the system performs a final human detection. In such case, the method comprises updating the terrain map and panoramic HoG map by inserting new point(s) or updating existing point(s).

Example of Panoramic Map and Polar Coordinates

Figure 7:
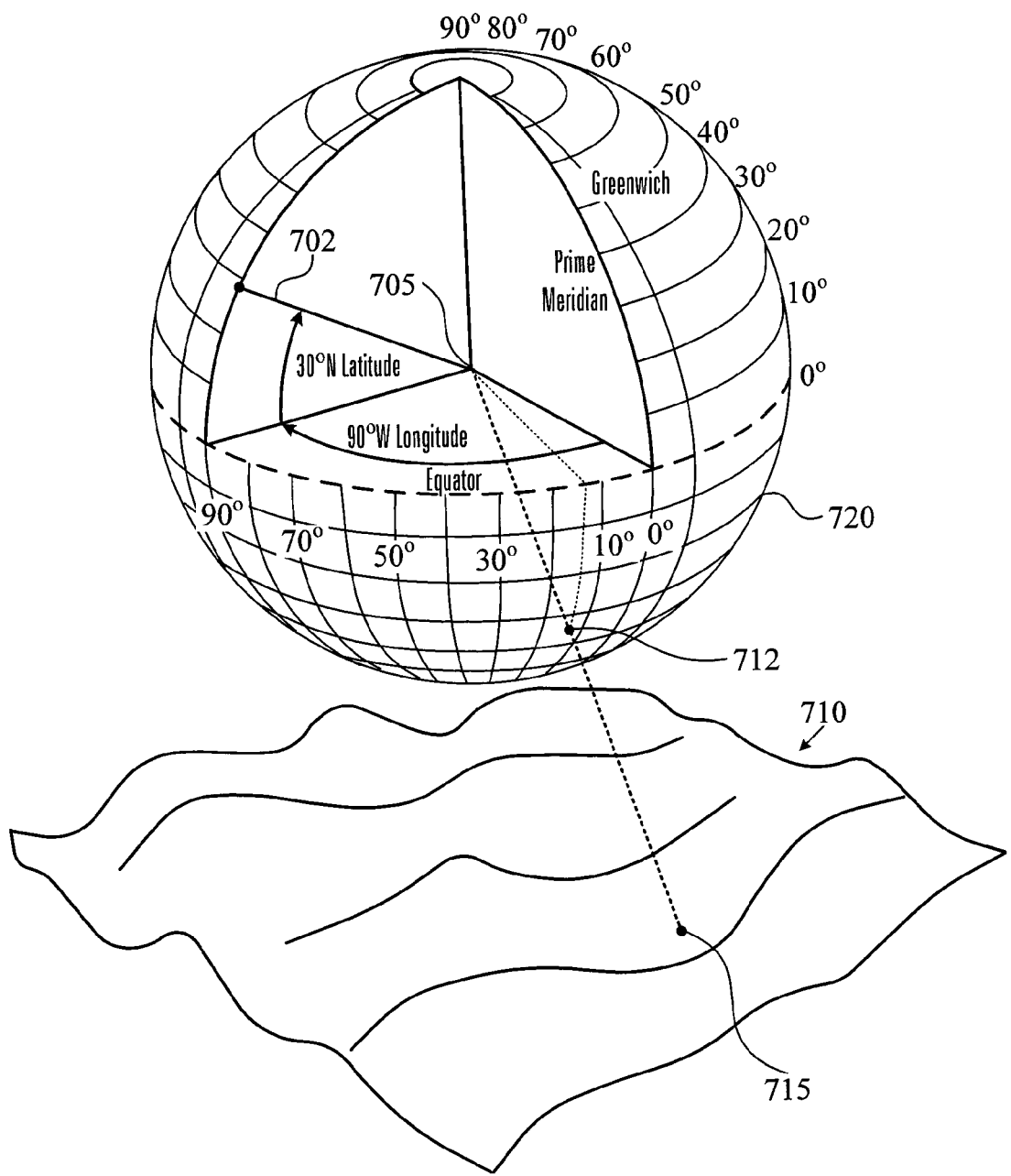
FIG. 7 shows a panoramic map reflected from a non-panoramic map, according to exemplary embodiments of the disclosed subject matter.

FIG. 7 shows a panoramic polar map reflected from a linear map, according to exemplary embodiments of the disclosed subject matter. The linear map 710 shows a terrain with a complicated structure. For example, point 715 of the linear map 710 represents a relatively high terrain point. The point 715 of the linear map 710 is also represented at panoramic polar map 720, at point 712. The panoramic polar map 720 comprises many points, each represents a different terrain point. The points of the panoramic polar map 720 are defined by longitude 704 and latitude 702 as appearing from a focal point 705. The focal point 705 represents the location of the camera.

When detecting a person at the panoramic polar map 720, the person is detected at a specific terrain point, such as terrain point 742.

Figure 9:
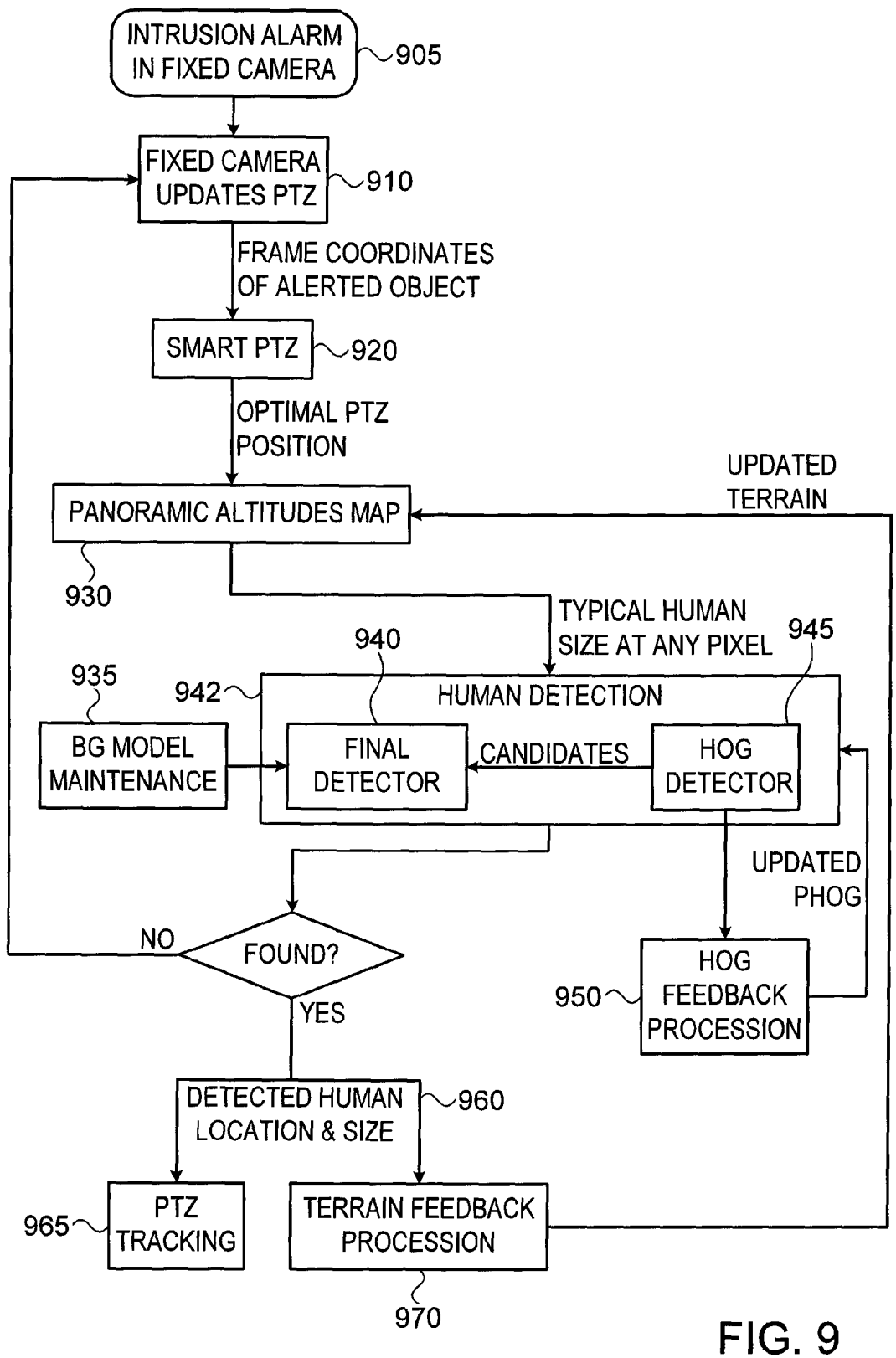

FIG. 9 shows a system for detecting a human object in an image, using both fixed and PTZ cameras, according to exemplary embodiments of the disclosed subject matter.

The system comprises a fixed camera 905 that performs intrusion detection. When the fixed camera 905 raises an alarm, it updates the PTZ camera using communication channel 910. The system further comprises a PTZ camera 920 that receives frame coordinates of the intruder from the fixed camera 905. The PTZ camera 920 translates the fixed camera coordinates to 3D coordinates. Then it determines optimal pan tilt and zoom values, such that the object will be near the PTZ frame center and with appropriate zoom, in order to detect the object that caused the alarm.

The PTZ camera 920 communicates with a Panoramic altitudes Map unit 930 that determines the perspective of the PTZ camera 920. The Panoramic altitudes Map unit 930 provides the PTZ camera 920 with a typical human object size that is sent to a human detection module 942.

The human detection module 942 comprises a HoG detector 945 for detecting a HoG matching value on the PTZ frame.

The human detection module 942 further comprises a Final Detector 940 that uses a background model, foreground model, HOG detector, clustering and object's trajectory in order to determine the final decision for the PTZ camera 920. A background model unit 935 provides the background model used by the final detector 940. The background model unit 935 communicates with the final detector 940 and stores data related to the background of the scene.

The HoG detector 945 communicates with a HoG feedback processing unit 950, which receives data concerning the HOG scores on the frame and updates the PHOG map accordingly, which affects next human detection sessions.

After the human detection finishes calculations, it is determined whether the human object was detected or not. If the human object was not detected, the fixed camera 910 updates the PTZ camera 920 with new object's coordinates. If the human object was detected, the PTZ camera 920 continues tracking as shown in 965, and the terrain feedback processing unit 970 updates the Terrain Map 930 with current human object size.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A method, comprising:
   obtaining a scene from a video camera and defining at least one point of the scene;
   creating a first scene terrain model of the scene, said first scene terrain model comprises a human object size in pixels in said at least one point of the scene;
   creating a second scene model of the scene, said second model defines a false positive determination that said at least one point comprises a human object;

wherein said second scene model is created when the scene does not contain a human object;
obtaining an image of the scene, said image is captured by a video camera;
determining whether the human object is detected at the at least one point of said captured image by applying said first scene terrain model and said second scene model on the at least one point;
wherein the second scene model of the scene comprises a Panoramic HOG map;
obtaining a position of a PTZ camera, the position including values of pan, tilt and zoom;
detecting a PTZ frame by the PTZ camera at the obtained PTZ position;
obtaining a successful detection of the human object in a specific location in the frame of the PTZ camera;
determining the polar coordinates of the human object;
determining an altitude of the human object; and
obtaining a panoramic map of the detected PTZ frame and identifying a point of the panoramic map closest to the detected human object, according to the determined polar coordinates.

2. The method according to claim 1, further comprises determining a matching point in the panoramic map closest to the specific pixel.

3. The method according to claim 1, wherein determining the altitude of the object after obtaining a bounding box of human object, and selecting two pixels of the bounding box.

4. The method according to claim 3, wherein the two pixels are a top pixel having top coordinates (x, y1) and a bottom pixel having bottom coordinates (x, y2), defining x as the horizontal middle of the bounding box.

5. The method according to claim 4, further comprises converting the top pixel and the bottom pixel into polar coordinates, thereby obtaining a polar top pixel (Π1,θ1) and a polar bottom pixel (Π2, θ2).

6. The method according to claim 4, further comprises converting the polar coordinates of top pixel and the bottom pixel into 3D world coordinates.

7. The method according to claim 4, further comprises obtaining 2 rays starting from a 3D origin located at a first ray pixel P1=z1v1, and a second ray pixel P2=z2v2.

8. The method according to claim 7, wherein determining the altitude of a standing human, wherein a line connecting the first ray pixel and the second ray pixel is defined as vertical and parallel to Y-axis.

9. The method according to claim 7, further comprises determining the object's altitude in a specific point after determining a Y-coordinate of the second ray pixel.

10. The method according to claim 1, wherein creating the second scene model comprises determining HOG matching scores for all pixels of the image of the scene.

11. The method according to claim 10, further comprises obtaining an object's location on the frame in pixels.

12. The method according to claim 11, further comprises converting the human object's location in pixels into polar coordinates on a panoramic map.

13. The method according to claim 10, further comprises obtaining Panoramic HOG point associated to the polar coordinates of the pixels in which the human object is located.

14. The method of claim 1, wherein the human object size is determined according to scene geometry and altitude maps.

15. A method, comprising:
obtaining a scene from a video camera and defining at least one point of the scene;
creating a first scene terrain model of the scene, said first scene terrain model comprises a human object size in pixels in said at least one point of the scene;
creating a second scene model of the scene, said second model defines a false positive determination that said at least one point comprises a human object; wherein said second scene model is created when the scene does not contain a human object;
obtaining an image of the scene, said image is captured by a video camera;
determining whether the human object is detected at the at least one point of said captured image by applying said first scene terrain model and said second scene model on the at least one point;
obtaining a position of a PTZ camera, the position including values of pan, tilt and zoom;
detecting a PTZ frame by the PTZ camera at the obtained PTZ position;
obtaining a successful detection of the human object in a specific location in the frame of the PTZ camera;
determining the polar coordinates of the human object;
determining an altitude of the human object;
obtaining a panoramic map of the detected PTZ frame and identifying a point of the panoramic map closest to the detected human object, according to the determined polar coordinates.

16. A method, comprising:
obtaining a scene from a video camera and defining at least one point of the scene;
creating a first scene terrain model of the scene, said first scene terrain model comprises a human object size in pixels in said at least one point of the scene;
creating a second scene model of the scene, said second model defines a false positive determination that said at least one point comprises a human object; wherein said second scene model is created when the scene does not contain a human object;
obtaining an image of the scene, said image is captured by a video camera;
determining whether the human object is detected at the at least one point of said captured image by applying said first scene terrain model and said second scene model on the at least one point;
wherein creating the second scene model comprises determining HOG matching scores for all pixels of the image of the scene;
obtaining a position of a PTZ camera, the position including values of pan, tilt and zoom;
detecting a PTZ frame by the PTZ camera at the obtained PTZ position;
obtaining a successful detection of the human object in a specific location in the frame of the PTZ camera;
determining the polar coordinates of the human object;
determining an altitude of the human object; and
obtaining a panoramic map of the detected PTZ frame and identifying a point of the panoramic map closest to the detected human object, according to the determined polar coordinates.

* * * * *